Figure 1:
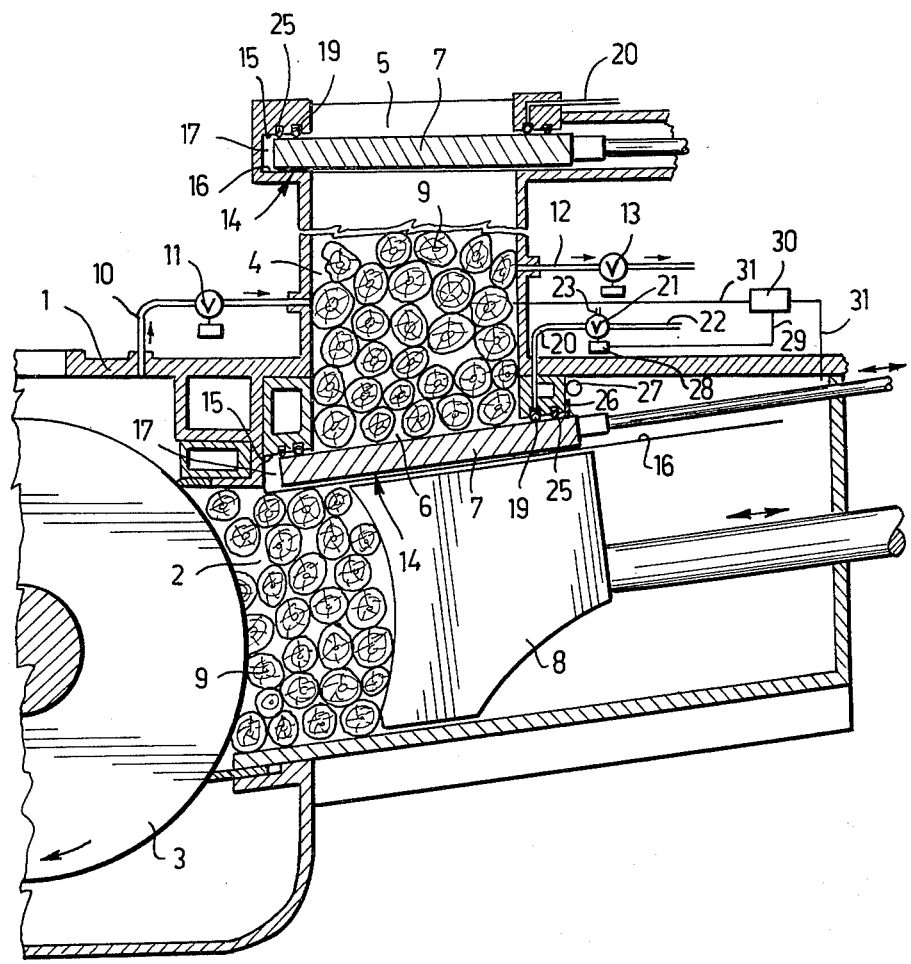

United States Patent [19]

Haikkala et al.

[11] 4,305,590
[45] Dec. 15, 1981

[54] SEALING ARRANGEMENT FOR A SHUTTER OF A PRESSURE GRINDER

[75] Inventors: Pekka Haikkala, Vuolteenkatu; Eero Hanhilahti, Varalank; Raimo Pessa, Järvikatu; Matti Aario, Loukonlahdentie, all of Finland

[73] Assignee: Oy Tampella AB, Tampere, Finland

[21] Appl. No.: 156,133

[22] Filed: Jun. 3, 1980

[30] Foreign Application Priority Data

Jul. 20, 1979 [FI] Finland .................................. 792288

[51] Int. Cl.³ .......................... B27L 11/06; F16J 15/48
[52] U.S. Cl. ..................................... 277/12; 277/34.3; 277/DIG. 7; 241/28; 241/282
[58] Field of Search ................ 277/12, 34, 34.3, 34.6, 277/226, DIG. 7; 241/28, 280–282, 285 R

[56] References Cited

U.S. PATENT DOCUMENTS

| 3,596,841 | 8/1971 | Perry | 241/282 X |
| 3,690,568 | 9/1972 | Alexander | 241/282 X |
| 3,690,572 | 9/1972 | Thumm et al. | 241/282 X |
| 3,693,891 | 9/1972 | Remmer | 241/282 X |
| 4,135,698 | 1/1979 | Smith | 277/34.3 X |
| 4,214,760 | 7/1980 | Godfrey | 277/34.3 |
| 4,270,703 | 6/1981 | Haikkala | 241/28 X |
| 4,274,600 | 6/1981 | Haikkala | 241/281 X |

Primary Examiner—Robert S. Ward, Jr.
Attorney, Agent, or Firm—Ladas & Parry

[57] ABSTRACT

A sealing arrangement for a shutter for a feeding chamber of a continuously operating pressure grinder. The feeding chamber is provided with an inlet opening for feeding wood batches at atmospheric pressure into said feeding chamber and with an outlet opening for feeding said wood batches into the grinding chamber at overpressure. Each opening of said feeding chamber is provided with a shutter movable between an opened position and a closed position for preventing of escape of said overpressure through said feeding chamber.

The feeding chamber is provided with a fixed guide supporting the shutter during its movement between opened and closed positions. Said guide comprises two parallel support surfaces between which the shutter is slidably mounted. The distance between said support surfaces is greater than the thickness of the shutter adjacent said support surfaces so that the shutter is displaceable towards and away from said support surfaces in a direction perpendicular to said support surfaces. A sealing element is provided in one of said support surfaces in such a way that, when the shutter is displaced away from said one support surface towards the other support surface, the shutter is released from contact with said sealing element. In this way the shutter is due to the pressure difference between opposite sides of the shutter pressed against said one support surface and against said sealing element but is released from contact with said support surface and said sealing element when the pressures are equilized on opposite sides of the shutter and can be moved to open and closed positions without said contact.

10 Claims, 3 Drawing Figures

SEALING ARRANGEMENT FOR A SHUTTER OF A PRESSURE GRINDER

The present invention relates to a sealing arrangement for a shutter for a feeding chamber of a continuously operating pressure grinder, said feeding chamber being provided with a fixed guide for the shutter movable between an open and a closed position and with a sealing support surface for providing a sealing between the feeding chamber and the shutter in its closed position.

Finnish Patent Application No. 780,514 describes a method which makes possible the use of a pressure grinder for continuous grinding of wood blocks. According to this method, wood blocks are fed into the grinding chamber of the grinder through a feeding chamber limited by two shutters which are opened and closed in separate steps. In the feeding chamber positioned between the two shutters, the pressure is increased to correspond to the pressure in the grinding chamber before opening the shutter closing the opening from the feeding chamber to the grinding chamber and reduced, respectively, to correspond to atmospheric pressure before opening the shutter closing the opening from the feeding chamber to the atmosphere.

However, when carrying out the known method described above, a tight and reliable sealing of said displaceable shutters presents a problem.

The sealing of the shutters is hampered by several factors. One is the big size of the shutters, which is due to the size of the block batch required. The shutters must therefore by sturdy so as to resist the impacts caused by the blocks are the overpressure of the grinding chamber. However, the large size of the shutters makes it difficult to provide exact tolerances.

Secondly, the feeding of the wood blocks into the grinding chamber requires rapid movements of the shutter so that the blocks will fall in good order into the grinding chamber and not prevent the closing of the shutter. Such rapid movements produce great frictional forces in the guide surfaces of the shutter, and especially the static friction in the initial stage of the movement is considerable.

Thirdly, in particular the shutter of the feeding chamber facing the grinding chamber has to operate under fouled and wearing conditions. Thus, the sealing surface of the shutter cannot remain sufficiently clean and smooth to provide a reliable sealing.

For the above-mentioned reasons, conventional sealing constructions are not suitable for sealing the shutter of the feeding chamber in a continuously operating pressure grinder.

The object of the present invention is to provide a sealing arrangement which eleminates the above-mentioned disadvantages and makes possible to provide by simple means a reliable sealing of the shutter for a feeding chamber of a continuously operating pressure grinder. This object is achieved by means of a sealing arrangement according to the invention which is characterized in that the shutter is mounted with play on said guide so that the shutter is displaceable toward and away from said fixed support surface in a direction transverse to the path of movement of the shutter along said guide, and in that a sealing element facing the shutter is mounted on said fixed support surface so that, as the shutter is displaced in a direction away from said fixed support surface, the shutter is released from contact with said sealing element.

The invention is based on the idea that the shutter can be lifted up from said guide into engagement with the fixed support surface and the sealing element provided therein when a pressure difference prevails between opposite sides of the shutter which pressure difference causes the shutter to be pressed against the fixed support surface and, respectively, be lowered on said guide out of engagement with said support surface and said sealing element when equally high pressures prevail on opposite sides of the shutter. Thus, in the latter case, there will be a gap between the shutter and the support surface so that the shutter does not scrape against the support surface and the sealing element when the shutter is moved into the open position. The sealing between the shutter and the support surface is effected by means of the sealing element which engages the shutter sealingly only when said pressure difference prevails between opposite sides of the shutter. When equally high pressures are acting on both sides of the shutter, the shutter has been lowered out of engagement with the sealing element and the shutter can be opened without scraping against the sealing element.

Preferably, the sealing element is expandable by means of a pressure medium. In this case, the distance over which the shutter must be displaced away from the support surface and the sealing element before opening the shutter can be shortened because the sealing element can be of such a type which, when contracted, will be withdrawn into the support surface and will only under pressure expand outside the support surface.

Because it is possible that the expansible sealing element may be damaged, e.g., due to mechanical damage, the support surface is preferably provided with a second safety sealing element. This spare sealing element can be identical with the expansible sealing element acting as a main sealing or, for example, a normal O-ring against which the shutter is pressed when a pressure difference prevails between opposite sides of the shutter.

In order to keep clean the shutter surfaces participating in the sealing, a cleaning means is preferably provided which by wiping, spraying and/or in any other manner cleans said surfaces of the shutter as the shutter is moved past said cleaning means.

Figure 2:
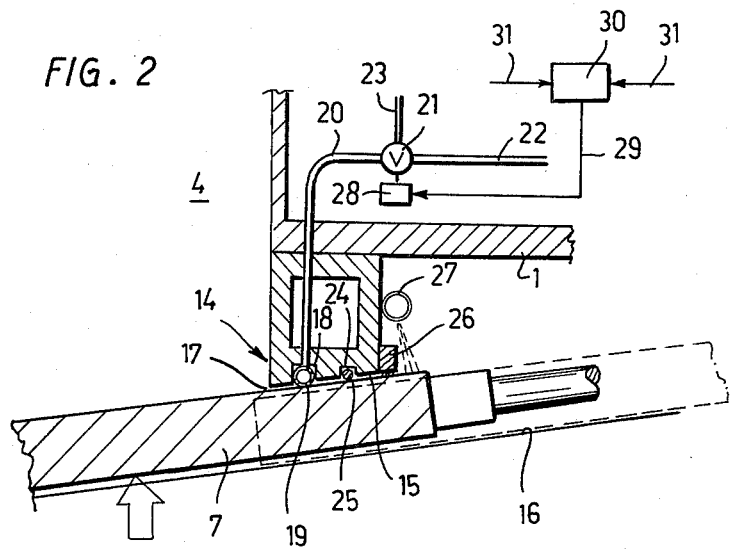
Figure 3:
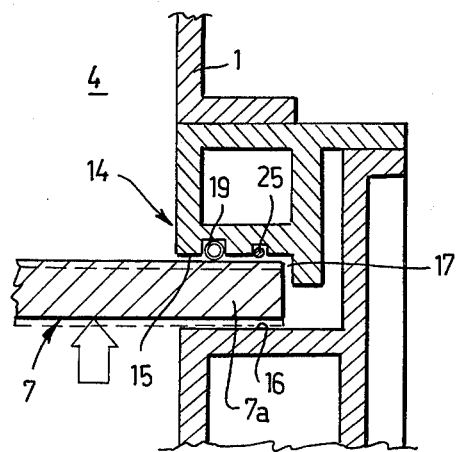

The invention will now be described in more detail with reference to the accompanying drawings in which FIG. 1 is a vertical section of a pressure grinder provided with a sealing arrangement according to the invention, and FIGS. 2 and 3 are cross-sectional views on an enlarged scale of the sealing point in a vertical plane parallel to the direction of movement of the shutter and in a vertical plane perpendicular thereto, respectively.

The pressure grinder shown in the drawings comprises a frame 1, a grinding chamber 2 in said frame, a grinding stone 3 rotatably mounted in said grinding chamber, a feeding chamber 4 supported by said frame, an inlet opening 5 and an outlet opening 6 located in the upper and lower part, respectively, of said feeding chamber, shutters 7 displaceably mounted in the upper and lower part of said feeding chamber, and a pushing element 8 displaceably mounted under said feeding chamber.

According to the principle of operation of the pressure grinder wood blocks 9 to be ground are dropped into the feeding chamber 4 while the upper shutter is open and the lower shutter is closed whereupon the upper shutter is closed. By opening a valve 11 in a conduit 10 connecting the feeding chamber with the grinding chamber, a pressure corresponding to the overpressure (e.g., 1 to 3 bar) acting in the grinding chamber is obtained in the feeding chamber. Hereafter, the lower shutter is opened whereby the blocks in the feeding chamber will fall down into the grinding chamber. By closing the valve 11 and by opening a valve 13 in a conduit 12 connecting the feeding chamber to the atmosphere, atmospheric pressure is obtained in the feeding chamber whereby the upper shutter can again be opened for a new batch of wood.

Each shutter is guided by a guide 14 provided with parallel support surfaces 15, 16 (FIGS. 2 and 3) positioned at a distance above each other. The shutter is mounted in the slit 17 formed between said surfaces. According to the invention, the shutter is mounted with play in the guide, i.e. the thickness of the edge portion 7a of the shutter is smaller than the distance between the support surfaces 15, 16 of the guide.

The upper support surface 15 of each guide which extends around all four sides of the feeding chamber is provided with a groove 18 in which is mounted a tubular, expandable sealing tube 19 which, as a continuous ring, encircles the openings 5 and 6 respectively of the feeding chamber. The inner space of the sealing tube is by means of a conduit 20 connected with a three-way valve 21 provided with connections 22, 23 to a source of pressure air or pressure liquid (not shown) and to the atmosphere, respectively. The upper support surface 15 of the guide serves as a holder for the expandable sealing tube 19.

The upper support surface 15 of each guide is also provided with a groove 24 for an O-ring 25 which outside said sealing tube 19 encircles the opening of the feeding chamber.

Behind that part of the support surface 15 which, in relation to the grinding stone 3, is located at the rear edge of the outlet opening 6 of the feeding chamber are fastened a spring-loaded steel brush 26 contacting the upper surface of the shutter and a shower device 27.

The above-mentioned three-way valve 21 is provided with an adjjusting device 28 which, by means of a conduit 29, is connected with a sensor element 30, which, by means of conduits 31, senses the pressure difference between the feeding chamber 4 and the grinding chamber 2.

When the upper shutter 7 has been closed after the batch of wood 9 has been dropped into the feeding chamber 4 and the pressure in the feeding chamber has by opening the valve 11 been raised to the level of the pressure in the grinding chamber 2 and, accordingly, no pressure difference prevails between opposite sides of the lower shutter 7, the sensing element 30 gives an impulse to the three-way valve 21 to reduce the overpressure of the expansible sealing tube 19 so as to draw the sealing away from the upper surface of the shutter and, in addition, also partly into its groove 18 in the support surface 15. As no pressure difference any longer prevails over the shutter, the shutter has dropped down on the lower support surface 16 of the guide 14 and, accordingly, also out of contact with the spare sealing element 25. The shutter can now be pulled open without the shutter touching the upper support surface and the sealings. This has been illustrated by dotted lines in FIGS. 2 and 3.

After the batch of wood has dropped from the feeding chamber into the grinding chamber, the lower shutter is again closed whereby the brush 26 and the water and air jets directed from the shower device 27 wipe the surface of the shutter clean of any sticks and pulp. When the shutter has reached its closed position, the required overpressure is by means of the three-way valve 21 created in the expandable sealing tube 19 whereby the sealing tube expands and seals against the shutter. Hereupon the connecting valve 11 is closed and the connection of the valve 13 from the feeding chamber to the atmosphere is opened. In this way, the feeding chamber will have atmospheric pressure whereby the overpressure in the grinding chamber causes the shutter to lift against the upper support surface 15 of the guide already at a pressure difference of about 0.5 bar. Thereby the sealing action of the expansible sealing tube 19 is further improved and the shutter is pressed also against the spare sealing element 25. Even if the overpressure should disappear from the expansible sealing tube 19, the spare sealing element 25 will prevent any leaks.

When the overpressure in the feeding chamber 4 has been balanced to correspond to atmospheric pressure, the upper shutter 7 can again be opened. As far as the expansible sealing tube 19 and the spare sealing element 25 of the upper shutter are concerned, the operation is the same as described in connection with lower shutter. Thus, before being opened, the shutter has been lowered on the lower support surface 16 of the guide 14 out of contact with the upper support surface as well as the sealing tube and the sealing element.

Thanks to the invention, the shutters can be opened and closed without being in contact with their sealing means and the support surfaces in which said sealing means are mounted. In spite of this, a reliable sealing will be obtained due to a pressure difference across the shutter. The sealing means are located, well protected against damage and fouling, under the upper support surface of each guide, and the upper surface of each shutter can be made smooth and easy to clean. Due to the expansion of the sealing tube, the gap between the support surface and the shutter can amount to, e.g., 0.05 to 5 mm, preferably 2 to 3 mm.

The drawings and the specifications related thereto are only intended to illustrate the idea of the invention. In its details, the arrangement according to the invention may vary within the scope of the claims. Instead of using an expansible sealing tube, a non-expansible sealing element can be provided which is mounted on an expandable ring or some other expandable seat. The invention can also be carried out by means of a non-expansible sealing element which is mounted substantially immovably on a support surface, the distance between the support surface 15, 16 being selected somewhat bigger so that the shutter also in this case is disengaged from the sealing element before movement of the shutter.

We claim:

1. A sealing arrangement for a shutter for a feeding chamber of a continuously operating pressure grinder, said feeding chamber (4) being provided with a fixed guide (14) for the shutter (7) movable between an open and a closed position and with a sealing support surface (15) provided with a sealing element (19) facing the shutter (7) for providing a sealing between the feeding chamber and the shutter in its closed position, characterized in that the shutter (7) is mounted with play on said guide (14) so that the shutter is displaceable toward and away from said fixed support surface (15) in a direction transverse to the path of movement of the shutter along said guide, and in that said sealing element (19) is mounted on fixed support surface (15) so that, as the shutter is displaced in a direction away from said fixed support surface (15), the shutter is released from contact with said sealing element (19).

2. A sealing arrangement according to claim 1, characterized in that said sealing element (19) is expandable by means of a pressure medium.

3. A sealing arrangement according to claim 1, in which the shutter (7) is plate-like and the guide (14) comprises two support surfaces (15,16) which between themselves form a slit (17) movably receiving the shutter, characterized in that one support surface on said guide (14) forms said fixed sealing support surface (15) and in that the thickness of the edge part (7a) of the shutter (7) movable in the slit (17) is smaller than the distance between said support surfaces (15,16) forming said slit so that the shutter is displaceable in said slit in a direction perpendicular to the plane of the plate-like shutter.

4. A sealing arrangement according to claim 2 or 3, characterized in that the feeding chamber (4) is provided with a fixed support surface (15) encircling the opening to be closed by the shutter (7) and in that the sealing element (19) is mounted in a groove (18) in said support surface.

5. A sealing arrangement according to claim 4, characterized in that said support surface (15) is provided with a spare sealing element (25) mounted in a second groove (18) formed in said support surface and located adjacent said groove (18) receiving said expansible sealing element (19).

6. A arrangement according to claim 5, characterized in that said sealing element (19) is tubular, that the inner space of said sealing element (19) is connected to a source of pressure medium (22) and to the atmosphere (23), respectively, via a control valve (21) and that said control valve is arranged to connect the inner space of said sealing element (19) in communication with said source of pressure medium when the shutter has been displaced to its closing position and with the atmosphere when the pressure in the feeding chamber (4) has been brought to the same pressure level that prevails on the opposite side of the shutter.

7. A sealing arrangement according to claim 1, characterized in that the shutter (7) is provided at the outlet side of said feeding chamber (4) facing the grinding space (2).

8. A sealing arrangement according to claim 1, characterized in that the shutter (7) is provided at the inlet side of said feeding chamber (4) facing the atmosphere.

9. A sealing arrangement according to claim 1, characterized by cleaning means (26,27) provided adjacent the path of movement of the sealing surfaces of the shutter (7) for cleaning said surfaces.

10. A sealing arrangement according to claim 9, characterized in that said cleaning means (26,27) comprises a brush, a scraper and/or water or air spray means.

* * * * *